United States Patent
Kasperchik

(10) Patent No.: US 7,309,728 B2
(45) Date of Patent: Dec. 18, 2007

(54) FREEFORM FABRICATION LOW DENSITY MATERIAL SYSTEMS

(75) Inventor: Vladek P Kasperchik, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 379 days.

(21) Appl. No.: 10/339,824

(22) Filed: Jan. 9, 2003

(65) Prior Publication Data

US 2004/0161544 A1    Aug. 19, 2004

(51) Int. Cl.
*C08G 18/42* (2006.01)
(52) U.S. Cl. .................. 524/500; 524/502; 524/530; 524/548
(58) Field of Classification Search ............ 524/500, 524/502, 530, 548
See application file for complete search history.

(56) References Cited

U.S. PATENT DOCUMENTS

| 7,049,363 B2 * | 5/2006 | Shen ............... 524/500 |
| 2002/0016387 A1 | 2/2002 | Shen |

FOREIGN PATENT DOCUMENTS

| EP | 0393676 | 10/1990 |
| WO | WO 01/34371 | 5/2001 |
| WO | WO 01/78969 | 10/2001 |

* cited by examiner

*Primary Examiner*—Edward J. Cain

(57) ABSTRACT

A freeform fabrication system preferably includes low-density particles, a cationic polyelectrolyte component, an anionic polyelectrolyte component, and a polar solvent-based binder capable of stimulating a reaction between the cationic polyelectrolyte component and the anionic polyelectrolyte component to form a low-density particle-bound polyelectrolyte complex.

18 Claims, 1 Drawing Sheet

FREEFORM FABRICATION LOW DENSITY MATERIAL SYSTEMS

BACKGROUND

Freeform fabrication is fast becoming a popular process for manufacturing three-dimensional objects including finished products, prototype parts or models, and working tools. For example, freeform fabrication is used to make products such as structural ceramics and ceramic shell molds. Several methods of freeform fabrication involve a process of sequentially forming layers of the desired end product.

When freeform fabrication involves a process of sequentially forming layers, a number of planar layers are combined together to form a planar or non-planar, three-dimensional object. The object is formed layer-by-layer, with a segment of each layer representing a cross section of the final desired product. Adjacently formed layers are adhered to one another in predetermined patterns to build up the desired product.

In one freeform fabrication process, a powdery material is used to form each individual layer of the desired product. As shown in FIG. 1, a freeform fabrication unit (100) includes a supply of powdered build material. A measured quantity of the powder is dispensed from a supply chamber. A roller on a moving stage (103) distributes and compresses the powder at the top of a fabrication chamber (102). Then, a multi-channel jetting head, which may be based on inkjet printing technology, deposits adhesive or binder onto the powder in the fabrication chamber (102) in a two dimensional pattern. The jetting head may also be disposed on the moving stage (103). This two dimensional pattern is a cross section of the desired product. This jetting head may also eject ink or toner to provide a desired color or color pattern for that particular cross section of the desired product.

The powder becomes bonded in the areas where the adhesive is deposited, thereby forming a layer of the desired product. The process is repeated with a new layer of powder being applied over the top of the previous layer. The next cross section of the desired product is then formed into the new powder layer. The adhesive also serves to bind the adjacent layers of the desired product together.

This process continues until the entire object is formed within the powder bed in the fabrication chamber (102). The extra powder that is not bonded by the adhesive is then brushed away, leaving the base or "green" object. A user interface (104) allows a user to initiate and control the fabrication process.

Such a process offers the advantages of speedy fabrication and low materials cost. It is considered one of the fastest freeform fabrication methods, and can produce products in a variety of colors.

However, there are several disadvantages in conventional freeform fabrication processes including the fragility of the resulting product. Poor mechanical properties in the final product are a result of a low compression modulus which is due, in part, to poor powder adhesion. Poor mechanical properties are also manifested by fragility in extension, or low fracture strength. In both the intralayer and interlayer levels, the powder particles are only loosely glued together. More particularly, powders that are presently being used in the market are based on filler inorganic particles such as gypsum and/or plaster of Paris, etc., together with water swellable polymers such as starches, poly (vinyl alcohol), etc. and mixtures of these water swellable polymers.

When these types of systems are used, the powder surface is printed with an aqueous binder, and the polymer particles swell due to absorption of the aqueous binder. Adhesion is the result of the swelling of the polymer particles. Interaction of these powders with an aqueous binder results in poor mechanical strength as well as high porosity of the green object.

Also, parts made by powder-based freeform fabrication as well as jetted, direct build-up type freeform fabrication suffer from poor strength. The latter is due to the fact that only lower molecular weight polymers can be jetted since high molecular weight polymers have viscosities that are too high.

Further, the swelling process for the binding polymers of the above method tends to take place very slowly. The interaction between water and plaster of Paris also occurs very slowly. For these reasons, the conventional process requires more than an hour for the reacted materials to set and for the fabricated product to be removed from the powder bed.

Another problem that is directly associated with conventional powder-based freeform fabrication is the high density of the final product. The starting materials in the powder have such a high density that the prototype produced by the conventional process typically has a density that is greater than 1 g/cm$^3$. The high density of the prototype is a serious nuisance, particularly when 1:1 scale models of large objects are being produced.

Further, the poor mechanical properties in the resulting product are related to the fact that the green object, which is fabricated by producing layers in a powder bed, must be subjected to labor intensive post-processing. This post-processing often involves soaking the surface of the printed object with reinforcing agents such as cyanoacrylate glue, etc. Gypsum based powders and water swellable polymers currently available require long swelling times, which can be thirty minutes or more. Another disadvantage of this and similar processes is that the resulting products can have a poor resolution, represented by a grainy texture of the product.

As mentioned above, the currently available processes for freeform fabrication use loosely bound polymer and inorganic particles to produce a product that has poor mechanical properties and a grainy texture. While post-processing drying of the resulting article improves the mechanical properties slightly, the improvements are minimal and the drying process is very slow. Other post-processing measures include reinforcing with polymerizable glues such as cyanoacrylate, or surface finishing, but these measures are costly and labor intensive.

SUMMARY

In one of many possible embodiments, the present invention provides a freeform fabrication system that preferably includes low-density particles, a cationic polyelectrolyte component, an anionic polyelectrolyte component, and a polar solvent-based binder capable of stimulating a reaction between the cationic polyelectrolyte component and the anionic polyelectrolyte component to form a low-density particle-bound polyelectrolyte complex.

DETAILED DESCRIPTION

Figure 1:
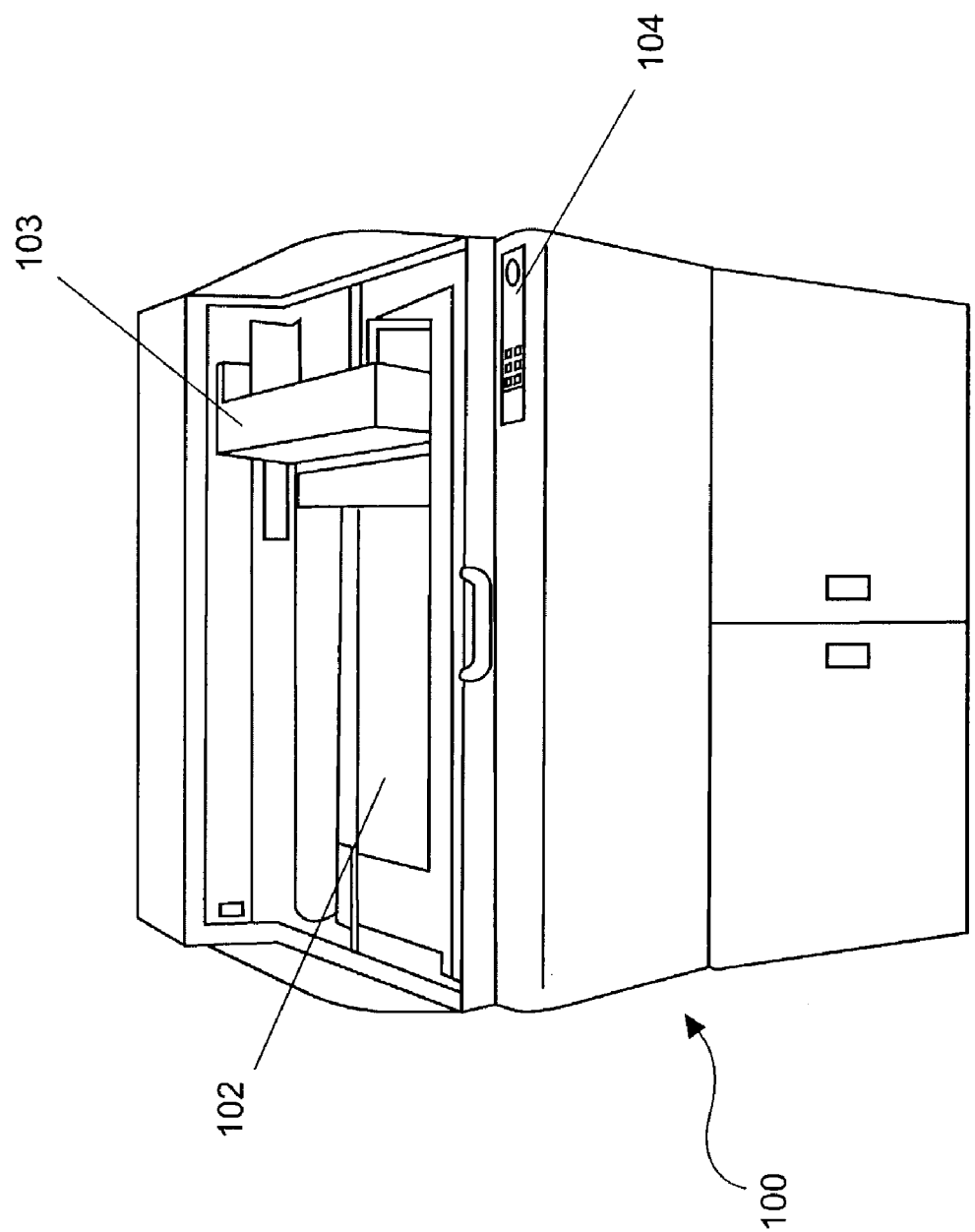
FIG. 1 illustrates a typical freeform fabrication system in which embodiments of the present invention can be used.

The following will describe a system for freeform fabrication, the compositions included in the system, and a freeform fabrication method incorporating the system. The system for freeform fabrication is preferably leveraged from polyelectrolytes that together can form a polyelectrolyte complex that binds low-density particles together. The components included in the system preferably include low-density particles, as the density of the fabricated products is partly determined by the density of the materials that form the product. The components in the system also preferably include a cationic polymer that serves as a polybasic electrolyte, and an anionic polymer that serves as a polyacidic electrolyte. The components in the system further include a polar solvent-based binder capable of dissolving the polyelectrolytes of the system.

When dissolved and/or mixed in solutions, oppositely charged polyelectrolytes will form a polyelectrolyte complex (PEC). Usually a PEC is made up of entangled polyanions and polycations (or polyacids and polybases) that have reacted together to form a conglomeration of polymer chains. The entangled polymer PEC can be used for binding other materials that are not as reactive in a reaction solution. When water or other polar solvent is added to charged polyelectrolytes, it leads to the dissolution and ionization of the polyelectrolytes. If the polyelectrolytes are oppositely charged, a PEC will be subsequently formed. If less reactive or essentially unreactive particles of an appropriate size are included in the PEC reaction solution, the entangled components of the PEC act as a binder that holds the particles together. For excellent binding of the low density particles, it's important that at least one of the polyelectrolytes, either the cationic or anionic one, is able to adsorb on the particle surface. For example, many cationic polyelectrolytes easily adsorb onto particles acquiring negative charge when in contact with liquid phase. Examples of particles with negative charge in aqueous environment include glass, many aluminosilicates, zeolites, soil particles (humic acid), etc. Hydrogen bonding between polyelectrolytes and particle surfaces also improves the binding capability of the PEC. For example, polyamidoamines and other soluble polymers containing amido groups in the side chains easily adsorb onto the surface of silica, glass or alumosilicates through hydrogen bonding of amido groups with hydroxyls of the surface.

It has been discovered that when a PEC acts as a binder to hold low density particles together, a fabricated product can be rapidly produced. Further, three-dimensional fabricated products made from the PEC and the low-density particles may have a density that is much less than 0.1 $g/cm^3$, providing ease in handling large-scale fabricated products, especially in comparison to the much denser fabricated products produced by commonly practiced processes. Further, the PEC forms very rapidly, in a matter of several seconds or less. Therefore, by binding the particles and the individual layers together using a PEC as a binder, the fabricated product produced according to the present method can be immediately removed from the bed of unbound particles in which the fabricated product was produced.

The anionic polyelectrolyte component according to the present invention can be one or more negatively charged polyacids, or polyacid salts. Examples of such polyacids or salts thereof include poly(carboxylic) acids, poly(sulfonic) acids, poly(phosphonic) acids, or other anionic polymers such as polyacrylates, polymethacrylates, anionically modified starches, and polysacoharides. These anionic polyacids or salts thereof may be singly represented as a homopolymer, or as a copolymer of one or more of the polyacids or polyacid salts. Further, the anionic polyelectrolytes may be also co-polymers of anionic monomers with non-ionic ones.

The cationic polyelectrolyte component can be one or more positively charged polybase or polybase salt. Examples of such polybases or salts thereof include poly (amine), poly(ethyleneimine), poly(amidoamine), poly(vinyl pyrrolidone), poly(diallyldimethyl ammonium salts), polyquternary ammmonium salts, various cationic acrylic copolymers, poly(vinyl pyridine), etc. These cationic polybases or salts thereof may also be singly represented as a homopolymer, or as a copolymer of one or more of the polybases or polybase salts. Further, cationic polyelectrolytes may be also co-polymers of cationic monomers with non-ionic ones. Of course, the above are mere examples of myriad polyanions and polycations that can serve as polyelectrolytes to form the PEC to bind the particles and rapidly form a fabricated product according to the principles described herein.

Another major advantage of incorporating a PEC as a binder is the ability for the PEC to bind low-density particles together, even if the particles are essentially nonreactive with respect to one another and the PEC. In order to produce a fabricated product that is of very low density, to the point of being much less than 0.1 $g/cm^3$, the low-density particles can be chosen from among such compounds as silica, metal oxide, ceramic material, glass spheres, hollow silicon particles, hollow metal spheres, aerogel and closed pore metal sponges. The mixture of low-density particles need not be homogeneous, although it is often helpful to have the same type of particles forming the fabricated product in order to control such parameters as density, structure, and strength.

According to one embodiment, both the cationic polyelectrolyte and the anionic polyelectrolyte are mixed together with the low-density particles in a non-reacted state. The polyelectrolytes are soluble in a polar solvent such as, though certainly not limited to, water. The water or other polar solvent soluble polymers can be polybases and polyacids or their respective salts as mentioned above. Polybases and polyacids are preferred to their respective salts.

More particularly, low density particles such as porous silica, metal oxides, ceramics, hollow glass spheres, hollow silicon particles, hollow metal spheres, aerogel and closed pore metal sponges are present in the powder mixture at a concentration ranging from about 40 to about 99.9 wt. %. The cationic polymer in dry form is present in the powder mixture at a concentration ranging from 0.05 to 50 wt. %. It is preferred that the concentration of the cationic polymer in dry form ranges from 0.1 to 10 wt. %. The anionic polymer in dry form is also present in the powder mixture at a concentration ranging from 0.05 to 50 wt. %. It is preferred that the concentration of the anionic polymer in dry form ranges from 0.1 to 10 wt. %.

The powder mixture is used to form each individual layer of the desired product. Referring again to FIG. 1, a measured quantity of powder is first dispensed from a supply chamber. The powder is then distributed and compressed by a moving stage (103) at the top of a fabrication chamber (102).

Then, a multi-channel jetting head, also preferably disposed on the moving stage (103), deposits the aqueous or polar solvent based binder onto the powder in the fabrication chamber (102) in a two dimensional pattern. The polyelectrolytes in the powder immediately dissolve in the binder solvent, and form a PEC.

The rate of polyelectrolyte particles dissolution is very important. There are several ways to improve dissolution rate. A first way is to use polyelectrolyte particles of a small size. It is preferable that the particles be below 30 μm in average diameter, and more preferably below 10 μm. It is most preferable that the particles be under 1-2 μm in average diameter.

A second way to improve the dissolution rate is to use a jetted binder solution that includes one or more polymers that are chemically similar to the polymer(s) in the dry powder. Dissolution rate is improved this way because polymer particle wetting is improved. For example, if the powder contains polyacrylic acid, the jetted binder may also contain a polyacrylic acid, preferably of a lower molecular mass or at lower concentration relative to the similar polymer in the powder in order to enable jetting of the liquid. The main advantage to having a low molecular mass polymer or a low concentration polymer in the binder solution is that high viscosity polymer solutions are difficult to jet. Generally it is preferable to have a lower molecular weight polymer at higher concentration in the binder, over having a higher molecular weight polymer at a lower concentration.

A third way to improve the dissolution rate is to pre-coat polymer(s) in the dry powder with binder solution. This assures that: 1) all surfaces of the particle have adhesive on them; 2) all reactions and reaction rates are uniform; 3) the structures become more homogeneous; 4) the reaction becomes more complete.

The two dimensional pattern in which the binder is jetted onto the powder is a cross section of the desired three-dimensional product. The binder solvent may also include a colorant, such as a dye, ink or pigment, to provide a desired color or color pattern for this particular cross section of the fabricated product.

The process recited above with regard to a single two-dimensional layer is repeated, with a new layer of powder being applied over the top of the previous layer in the fabrication chamber (102). The next cross section of the desired product is then produced into the new powder layer. The binder also serves to bind the particles in the adjacent layers of the desired product together.

This process continues until the entire object is formed within the powder bed in the fabrication chamber (102). The extra powder that is not bonded by the adhesive is then brushed away, leaving the base or "green" object. Open air or oven drying will reinforce the object and further reduce its density.

According to another embodiment, one of the polyelectrolytes, meaning either the cationic polyelectrolyte or the anionic polyelectrolyte is mixed with the low-density particles in a non-reacted state. A solvent in which the polyelectrolyte is soluble is added to the mixture to form a slurry. The slurry of low-density particles and the cationic or anionic polyelectrolyte forms the printable material to which the binder is to be selectively applied. The binder is applied to regions of the individual layers of the slurry as the layers are formed adjacent to one another.

The binder includes the polyelectrolyte of an opposite charge relative to the polyelectrolyte that is part of the slurry. The binder includes water or another polar solvent that is miscible with the solvent in the slurry. Therefore, if the printable slurry contains a solution of the cationic polyelectrolyte, then the binder contains a solution of the anionic polyelectrolyte, and vice versa. The low-density particles are present at a concentration ranging from 80 to 99.9 wt. %. The cationic or anionic polyelectrolyte mixed with the low-density particles is present at a concentration ranging from about 0.1 to about 20 wt. %. The oppositely charged polyelectrolyte, relative to the polyelectrolyte that is in the slurry, is also present at a concentration ranging from about 0.1 to about 20 wt. %. These weight percentages are based on a total dry weight of the polyelectrolytes and the low-density particles. The solvent can also contain a colorant such as a dye, an ink or a pigment.

After all of the individual layers are selectively bound due to the formation of the PEC within and between the layers, the green object is removed from the slurry bed, and the remaining non-reacted slurry is cleaned from the green object. Non-reacted slurry can be washed away by putting the green object in water bath. Unbound slurry will disperse while the PEC and the particles bound therein will remain intact as a final fabricated product. The fabricated product can then be dried in open air or by use of an oven. The drying step serves to reinforce the fabricated product and to further reduce its density. After drying, the printed object may be reinforced by soaking it in cyanoacrylate glue or other reinforcing agent.

The preceding description has been presented only to illustrate and describe embodiments of the invention. It is not intended to be exhaustive or to limit the invention to any precise form disclosed. Many modifications and variations are possible in light of the above teaching. It is intended that the scope of the invention be defined by the following claims.

What is claimed is:

1. A freeform fabrication material system, which comprises:
   a powdered build material comprising particles;
   a cationic polyelectrolyte component in said build material;
   an anionic polyelectrolyte component in said build material; and
   polar solvent-based binder capable of stimulating a reaction between said cationic polyelectrolyte component and said anionic polyelectrolyte component to form a polyelectrolyte complex,
   wherein said binder further comprises an additional polymer that increases a dissolution rate of said binder when said binder is applied to said build material; and
   wherein said polymer in said polar solvent-based binder includes a charged polyelectrolyte compound having one or more monomer components that are also present either in said cationic polyelectrolyte component in said build material or in said anionic polyelectrolyte component in said build material.

2. A freeform fabrication system according to claim 1, wherein said anionic polyelectrolyte component is one or more polyacid or polyacid salt from the group consisting of poly(carboxylic) acid, poly(sulfonic) acid, poly(phosphonic) acid, polyacrylates, polymethacrylates, anionically modified starch, polysaccharide and a copolymer of one or more of the polyacids or polyacid salts.

3. A freeform fabrication system according to claim 1, wherein said cationic polyelectrolyte component is one or more polybase or polybases salt from the group consisting of poly(amine), poly(ethyleneimine), poly(amidoamine), poly(vinyl pyrrolidone), poly (diallyldimethyl ammonium salt), polyquternary ammonium salt, cationic acrylic copolymer, poly(vinyl pyridine), and a copolymer of one or more of the polybases or polybase salts.

4. A freeform fabrication system according to claim 1, wherein said build material comprises at least one of silica, metal oxide, glass spheres, hollow glass spheres, hollow silicon particles, hollow metal spheres, aerogel and closed pore metal sponges.

5. A freeform fabrication system according to claim 1, wherein said polar solvent-based binder comprises water.

6. A freeform fabrication system according to claim 1, wherein one or both of said polyelectrolytes is absorbed on a surface of said particles.

7. A freeform fabrication system according to claim 1, wherein said anionic polyelectrolyte component has a wt. % content of about 0.1 to about 20, said cationic polyelectrolyte component has a wt. % content of about 0.1 to about 20, and said particles have a wt. % content of about 80 to about 99.9 based on a total weight of combined and dried anionic and cationic polyelectrolyte and particulate build material.

8. A freeform fabrication system according to claim 1, wherein said anionic polyelectrolyte component has a wt. % content of about 0.05 to about 50, said cationic polyelectrolyte component has a wt. % content of about 0.05 to about 50, and said particles have a wt. % content of about 40 to about 99.9 based on a total weight of combined and dried anionic and cationic polyelectrolyte and particulate build material.

9. A freeform fabrication system according to claim 1, wherein said charged polyelectrolyte compound in said polar solvent-based binder is present at a lower concentration than the polyelectrolyte component in the build material having the same monomer components.

10. A freeform fabrication system according to claim 1, wherein said particles of said build material are precoated with a solution of said polar solvent based binder.

11. A freeform fabrication system according to claim 1, wherein said charged polyelectrolyte compound in said polar solvent-based binder has a lower average molecular weight than the polyelectrolyte component in the build material having the same monomer components.

12. A freeform fabrication system according to claim 1, wherein said binder comprises a colorant.

13. A material system for freeform fabrication, which comprises:
 a build material comprises particles;
 a first polyelectrolyte component comprising either at least one cationic polyelectrolyte component or at least one anionic polyelectrolyte component, said first polyelectrolyte component being disposed on said particles of said build material; and
 a jettable binder comprising a second polyelectrolyte component comprising either at least one cationic polyelectrolyte component or at least one anionic polyelectrolyte component, wherein said second polyelectrolyte component has a charge opposite said first polyelectrolyte component;
 wherein said build material and first polyelectrolyte component are mixed with a solvent in which said first polyelectrolyte component is soluble such that said build material and first polyelectrolyte component form a slurry prior to application of said jettable binder; and
 wherein said binder further comprises a colorant.

14. A material system according to claim 13, wherein said first polyelectrolyte component in said composition has a wt. % content of about 0.1 to about 20, and said build material particles have a wt. % content of about 80 to about 99.9 based on a total weight.

15. A material system according to claim 13, wherein said first polyelectrolyte component is one or more polyacid or polyacid salt from the group consisting of poly(carboxylic) acid, poly(sulfonic) acid, poly(phosphonic) acid, polyacrylates, polymethacrylates, anionically modified starch, polysaccharide and a copolymer of one or more of the polyacids or polyacid salts.

16. A material system according to claim 13 wherein said first polyelectrolyte component is one or more polybase or polybase salt from the group consisting of poly(amine), poly(ethyleneimine), poly(amidoamine), poly(vinyl pyrrolidone), poly (diallyldimethyl ammonium salt), polyquternary ammonium salt, cationic acrylic copolymer, poly(vinyl pyridine), and a copolymer of one or more of the polybases or polybase salts.

17. The material system of claim 13, wherein said build material comprises at least one of silica, metal oxide, glass spheres, hollow glass spheres, hollow silicon particles, hollow metal spheres, aerogel and closed pore metal sponges.

18. The material system of claim 13, wherein said binder comprises water.

* * * * *

UNITED STATES PATENT AND TRADEMARK OFFICE
CERTIFICATE OF CORRECTION

| | | |
|---|---|---|
| PATENT NO. | : 7,309,728 B2 | Page 1 of 1 |
| APPLICATION NO. | : 10/339824 | |
| DATED | : December 18, 2007 | |
| INVENTOR(S) | : Vladek P. Kasperchik | |

It is certified that error appears in the above-identified patent and that said Letters Patent is hereby corrected as shown below:

In column 4, line 1, delete "polysacoharides" and insert -- polysaccharides --, therefor.

In column 4, line 11, delete "ammmonium" and insert -- ammonium --, therefor.

In column 6, line 60, in Claim 3, after "polybase or" delete "polybases" and insert -- polybase --, therefor.

Signed and Sealed this

Tenth Day of June, 2008

JON W. DUDAS
*Director of the United States Patent and Trademark Office*